Nov. 17, 1970   G. S. MACON ET AL   3,540,294
MEANS FOR MINIMIZING GYROSCOPE TRENDING
Filed June 11, 1968

INVENTORS
GEORGE S. MACOR
MICHAEL A. NAPOLITANO
BY
ATTORNEY

United States Patent Office 3,540,294
Patented Nov. 17, 1970

3,540,294
MEANS FOR MINIMIZING GYROSCOPE TRENDING
George S. Macon, Bloomfield, and Michael A. Napolitano, Mendam, N.J., assignors to Singer-General Precision, Inc., Little Falls, N.J., a corporation of Delaware
Filed June 11, 1968, Ser. No. 736,094
Int. Cl. G01c 19/28
U.S. Cl. 74—5.5                                     6 Claims

ABSTRACT OF THE DISCLOSURE

A plurality of adjustable baffle plates are disposed within the gyro casing in a generally overlying coextensive manner with respect to the gyro's rotor or flywheel. Each baffle plate comprises a generally L-shaped planar member fixedly supported at one end in cantilever fashion and variably supported at its free end by an adjustment mechanism. The latter includes a bellows member for hermetically sealing the interior of the gyro casing and for providing an upward biasing force to the free end of the cantilevered baffle member. Coaxially disposed within the bellows member in abutting relation with the free end of the baffle is a set screw for precisely indexing the static position of the baffle relative to the gyro's rotor. The set screw is adapted to be rotated from a position external to the gyro housing.

BRIEF SUMMARY OF THE INVENTION

The present invention relates generally to the art of gyroscopes, and more specifically, to improvements in free-rotor flexure suspended gyros such as those disclosed, for example, in Pat. No. 3,077,785 by J. C. Stiles and Pat. No. 3,354,726 by W. J. Krupick et al., both assigned to the assignee of the instant invention. In particular, the subject matter herein relates to suitable means for mitigating the effects of undesirable gas or windage torques which act upon the rotor of such gyroscopes and which are caused primarily by the transient thermal conditions inherently produced during the gyro's warm-up cycle.

In recent years inertial guidance systems have been widely accepted as means for providing precise navigational data in aircraft, missiles, space vehicles and the like. In order to provide the high accuracy for which these systems are designed, they must have, in the least, extremely rapid warm-up characteristics. Since gyroscopes are universally used as essential components in inertial guidance systems, it is quite reasonable to expect that gyros too must have as short a warm-up time as the state-of-the-art will permit.

In the free-rotor flexure suspended gyroscope exemplified by the Stiles and Krupick et al. patents hereinabove cited, the warm-up cycle is primarily limited by the transient thermal conditions of the residual gas medium within which the rotor or gyro flywheel operates. As the gyro is heated from a cold start, these transient conditions are reflected in corresponding changes in the gas torques acting upon the flywheel. This results in an undesirable "trending" of the gyro's output that eventually decreases to the basic randomness of the instrument at which point a thermal equilibrium condition is established and the warm-up cycle is completed. The term "trending" as applied to the present disclosure refers to the rate of change of the gyro's drift per unit of time. Obviously, if such trending could be minimized or at best entirely cancelled, the gyro could then begin to supply accurate position information before thermal equilibrium is established thereby effectively shortening the gyro's warm-up time.

Experience has shown that the magnitude and polarity of trending varies from one gyro to another due to manufacturing tolerances in the outer casing and in other relatively non-critical structural parts inhering to such devices. Hence, a prior art technique for minimizing trending has been developed which consists essentially of first slightly tilting and then rotating the upper portion of the gyro casing (i.e., the portion of the casing nearest the rotor or flywheel) during a simulated warm-up period while simultaneously measuring the gyro's drift during this period. It was observed that at a unique angle of tilt and angular position of the gyro casing relative to the rotor's spin axis, the gas flow patterns, air gaps, and thermal paths surrounding the rotor could be adjusted sufficiently so that the gas torques acting on the rotor were made virtually insensitive to temperature variations. However, this provided only a relatively coarse adjustment since it proved to be almost impossible to maintain this unique position during final assembly. Moreover, even if the unique positioning of the gyro's casing were pursued through final assembly, future adjustment during the lifetime of the gyro would not be possible without breaking down the casing.

Therefore, in accordance with the present invention, a new and improved method and means for effecting the same have been developed for externally calibrating and compensating the trending characteristics of a free-rotor flexure suspended gyro after the latter has been assembled and sealed. In brief, the above is accomplished by providing a series of baffle plates supported from within the interior of the gyro casing in relative proximity to the rotor or flywheel. The position of each baffle with regard to the rotor is separately and individually made variable through a predetermined range via a hermetically sealed adjustment mechanism coacting with each baffle and extending through to the outside of the gyro casing. After final assembly, the gyro is run through a simulated warm-up cycle during which time the baffle plates are externally adjusted until "trending" has been virtually eliminated. This provides an extremely accurate initial calibration to the gyro which, in turn, produces a gyro having a substantially reduced warm-up time. However, in the event additional compensation and/or adjustment may be deemed necessary during the course of the gyro's lifetime, the baffle plates may simply be readjusted externally without altering the gyro's structural integrity.

These and other objects and advantages of the present invention will be made apparent from a study of the detailed aspects of the invention in connection with the accompanying drawings.

DETAILED DESCRIPTION OF THE INVENTION

Figure 1:
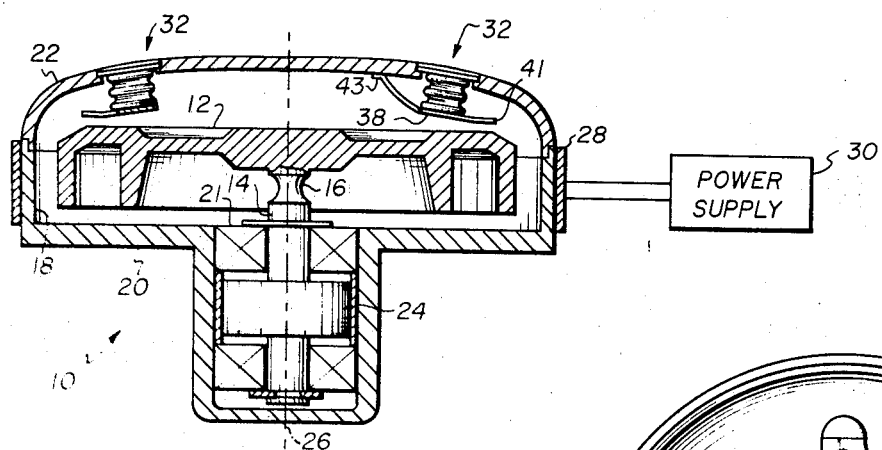
FIG. 1 is a cross-section of a gyroscope incorporating the adjustable baffle plates in accordance with the present invention.

Referring now to FIG. 1, there is schematically shown in cross-section a preferred form of free-rotor flexure suspended gyroscope 10. This gyroscope is of the type more fully disclosed in the previously mentioned patents to Stiles and Krupick et al. and therefore only those parts necessary for a complete understanding of the present invention are illustrated. The gyro rotor or flywheel 12 is rotatably suspended on a shaft 14 by a frictionless gimbal-hinge assembly or flexure joint 16 which interconnects shaft 14 and rotor 12 permitting universal tilting and motion therebetween. The upper portion of the gyro's casing comprises a generally cylindrical peripheral side wall 18, a bottom end wall 20, and a cup-shaped upper end cap member 22. A drive means 24 is operably connected to the shaft 14 for rotating the rotor 12. The drive means and shaft are, in turn, supported by bearings 21 for rotation about a spin reference axis 26 passing substantially centrally through the gyro casing as shown.

Generally speaking, gyroscope of the type disclosed are heated from a cold start to a predetermined operating temperature in order to preserve dimensional stability throughout their operational cycle. A preferred heating means may comprise for example, a relatively thin flexible filament strip 28 wrapped around the peripheral side wall 18 of gyro 10 as shown in FIG. 1. The filament is energized by a suitable power supply means as indicated at 30. As is well known in the art, the ambient atmosphere within the gyro casing comprises a residual gas under a partial vacuum of, say, 1/6 of an atmosphere. Accordingly, the heat transfer mechanism is primarily that of radiation and the thermal time constant is appreciably large requiring in some cases a warm-up time of approximately 120 minutes. During this warm-up cycle the thermal conditions of the residual gas are in a constantly changing or transient state and as mentioned hereinabove, this causes a corresponding change in the magnitudes and polarity of the windage torques or gas torques acting on the gyro flywheel. At thermal equilibrium, these gas torques are essentially constant. Thus, if the drift of an uncompensated gyro were measured during a hypothetical warm-up cycle, the rate of change of drift or "trending" of the gyro output would appear as represented by curve 50 in FIG. 4. After a period of time indicated, for example, by arrow 54, the measured drift would approach the basic inherent random rate imposed by the instrument itself, the thermal conditions of the residual gas would reach a condition of equilibrium, and the warm-up cycle would be completed at which juncture the gyro may be called upon to supply accurate position information. Now if by some means the trending of the gyro output (or more correctly, the transient condition of the windage torques supplied by the gyro's residual gas) could be minimized or eliminated, the warm-up time associated with the gyro in question could effectively be made correspondingly shorter.

Figure 2:
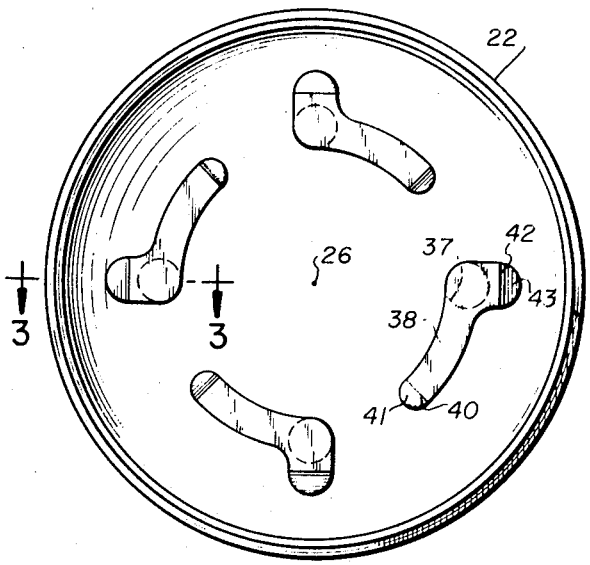
FIG. 2 is a view of the underside of the upper cap portion of the gyro of FIG. 1.
Figure 3:
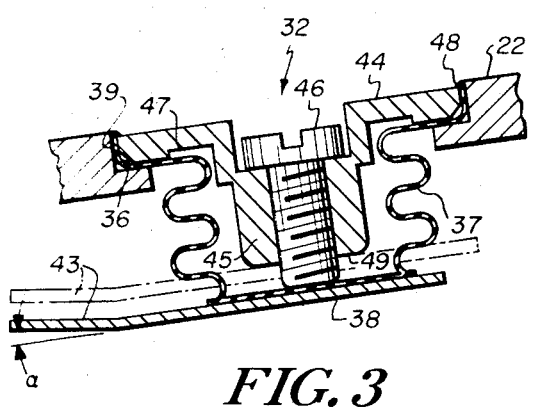
FIG. 3 is a detail of the adjustment mechanism in accordance with the present invention.

Such means are provided in accordance with the present invention in the form of a series of adjustable baffle plates as indicated generally in FIG. 1 by reference numeral 32 and as shown in more detail in FIGS. 2 and 3. As best seen in FIGS. 1 and 2, each baffle plate in its preferred form comprises a generally L-shaped planar member 38 having a foot portion and an arcuately shaped upstanding leg portion. The outer extremities of each portion are bent along crease lines 40 and 42 to form angled tab portions 41 and 43. Preferably, tab portion 41 makes an angle of approximately 20° downwardly with respect to the baffle plate 38 whereas tab portion 43 is bent upwardly from the baffle plate by approximately 7° as viewed in FIGS. 1 and 3, respectively. Tab portion 41 is cemented or soldered to the underside of upper cap member 22 to form a fixed cantilever support for the baffle plate. The L-shaped member 38 is therefore adapted to flex up and down relative to the upper cap member 22 as viewed in FIG. 1 about an axis coinciding with crease line 40 but is relatively restrained in the horizontal plane including this line.

In order to provide a precise static positional adjustment to the cantilevered baffle member, an adjusting mechanism is contemplated as shown in FIG. 3. The upper cap member 22 is drilled through at the appropriate location and then counterbored to form therein a cylindrically shaped recess or seat 36. A hollow cylindrical bellows member 37 which is preferably fabricated from a suitable metallic material next has its lowermost edge cemented to the upper surface of L-shaped member 38 in the region of the latter's heel (see FIG. 2). The upper edge portion of bellows member 37 which comprises a cylindrical peripheral side wall extension 39 of enlarged diameter and which is adapted to be seated snugly within the like contoured recess formed by counterbore 36 is then cemented or soldered tightly in place to form a hermetic seal against the outside atmosphere. Disposed coaxially within the hollow bellows member is a retainer ring 44 comprising a downwardly extending cylindrical bushing 45 and an integral upper coaxially disposed radially extending annular flange member 47 which latter is sized to fit snugly within the upper cylindrical extension 39 of bellows 37 and the recess formed by counterbore 36. The retainer ring flange member 47 is then preferably soldered in place as represented by fillet 48. As further indicated, flange member 47 is made thick enough to be substantially flush mounted within upper cap wall 22 when seated within recess 36. Before installation, the bushing portion 45 of the retainer ring is drilled through, counterbored, and then tapped to receive a threaded set screw 46 in abutting relation against the upper surface of plate member 38. Thus, as made obvious by FIG. 3, advancement of set screw 46 will cause the latter to bear against baffle plate 38 urging it downward away from the under surface of upper cap member 22 and toward the upper surface of rotor 12. Preferably, the set screw is extremely finely threaded to provide a vernier-like adjustment to member 38 and tab portion 43.

It will be noted that bellows member 37 is designed to bias the baffle plate upward at all times toward the bottom surface 49 of bushing 45. Hence, in the case where no adjustment is required, that is, when the set screw is backed-off sufficiently to allow the upper surface of the baffle plate member to bear directly against under surface 49 as indicated by the broken lines in FIG. 3, bellows member 37 will still exert enough of an upward force to prevent the plate member 38 from flapping against the bushing under surface in the presence of vibration and/or shaking forces. Of course, the upward biasing force supplied by bellows 37 will also help to preserve physical stability between the baffle plate 37 and the abutting set screw 46 when the former is in a positively adjusted position as shown.

In principle, the effect of adjusting the L-shaped member 38 (including tab portion 43) throughout its range is to smooth out or damp the variations in gas torques acting on the gyro rotor during transient heating of the residual gas within the gyro casing. At a unique position within this range, which must ordinarily be found through a process of trial and error, it will be found that the smoothing or damping effect is optimal.

Figure 4:
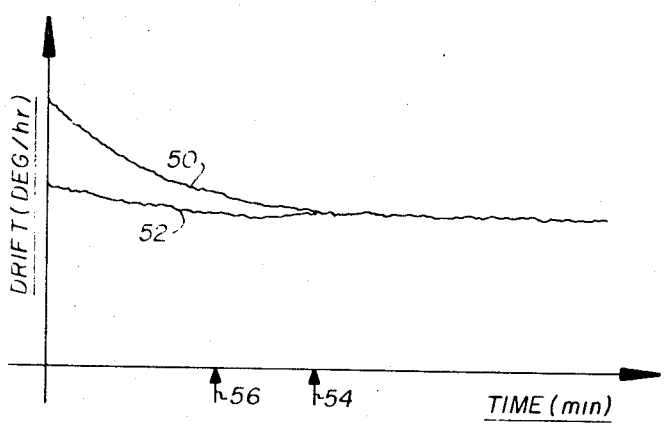
FIG. 4 is a graph plotting gyro drift against time as measured from a cold start.

Thus, in carrying out the present invention, it is merely necessary to run a completely assembled gyroscope through a simulated warm-up cycle and to vary the positional adjustments of the baffle plates via set screws 46 while monitoring the drift of the gyro's output in a known manner. As intimated above, it may be necessary to repeat this process several times; however, it will be found that at a unique adjustment of the baffle plates the "trending" tendency of the gyro will be almost entirely eliminated. For example, curve 52 in FIG. 4 represents the drift rate of a typical gyroscope calibrated by utilizing the adjustable baffle plates of the present invention. Note that the gyro's output has approached the basic random drift rate inherent in the instrument itself at a time indicated by arrow 56 and that this time is considerably shorter than the time (i.e., arrow 54) normally required by a non-compensated gyro. It is thus seen that the present invention is capable of effectively and efficiently shortening the warm-up time of such non-compensated gyros.

As depicted in FIG. 2, the present preferred embodiment comprises four adjustable baffle plates arranged so that the arcuate leg portions corresponding to these baffles are circumferentially aligned along a concentric circle radially offset from the gyro's spin axis 26. This is intended so that the respective baffles are in a substantially overlying coextensive relationship with that portion of rotor 12 having greatest mass. It will be appreciated, however, that the particular orientation and shape of the respective baffles is not limited to that described above, but may instead be subjected to a wide degree of variation depending upon the particular gyro rotor geometry in question. Moreover, it has been found that the scale factor relating to the adjustment of gyroscope trending effects as described hereinabove may be most significantly varied by changing the angle α between tab portion 43 and L-shaped member 38 and/or by varying the number of baffles used. Hence, these parameters are also subject to a wide range of experimentation and need not necessarily adhere to those specific values mentioned above by way of illustration. Obviously, many additional variations and modifications will be apparent to those skilled in the art without departing from the principles of the present invention.

What is claimed is:

1. In a free-rotor flexure suspended gyroscope comprising a housing having an upper cap enclosure member, and a rotor adapted for rotation within the cavity formed by said enclosure member about a spin reference axis, wherein the improvement comprises
means supported within said enclosure member for damping the gas torques acting on said rotor caused by heating said gyroscope from a cold start, said damping means including a baffle plate, means for suspending said baffle plate from said upper cap enclosure member in fixed relation relative to said rotating gyroscope rotor and means cooperating with said upper cap enclosure member and said suspending means for adjusting the position thereof relative to said rotor from a position external to said gyroscope housing.

2. In a free-rotor flexure suspended gyroscope including a housing having an upper cap enclosure member, and a rotor adapted for rotation within the cavity formed by said enclosure member about a spin reference axis, the improvement comprising:
means supported within said cavity for damping the gas torques acting on said rotor caused by heating said gyroscope from a cold start wherein said damping means comprises a baffle plate, and means for suspending said baffle plate from said upper cap enclosure member,
said suspension means including a flexible member locating said baffle plate between said upper cap member and said rotor, and a central element supported by said upper cap member in abutting relation with said baffle plate for changing the relative position of said baffle plate between said upper cap member and said rotor.

3. The apparatus of claim 2, wherein said flexible member comprises a hollow cylindrical bellows member coupled at one end to said upper cap member and at its other end to said baffle plate.

4. The apparatus of claim 3, wherein said control element comprises a set screw threadedly received in said upper cap member and adapted for rotation from a position external to said housing, said rotation being effective to vary the position of said baffle plate as hereinaforesaid.

5. The apparatus of claim 4, wherein said set screw is threadedly received in a cylindrical bushing, said bushing being coaxially disposed within said cylindrical bellows member and being supported from said upper cap member whereby said bellows member continuously urges said baffle plate toward the bottom-most surface of said bushing.

6. The apparatus of claim 2, wherein said baffle plate is substantially L-shaped, the up-standing or leg portion thereof being fixedly attached to said upper cap member and the heel portion thereof being fixedly attached to said elastic suspension member whereby the foot portion of said L-shaped baffle plate is substantially positioned in overlying coextensive relation to the portion of the gyro rotor having greatest mass.

References Cited
UNITED STATES PATENTS

| | | | |
|---|---|---|---|
| 2,948,155 | 8/1960 | Burkam | 74—5.5 XR |
| 3,077,785 | 2/1963 | Stiles | 74—5 |
| 3,126,747 | 3/1964 | Desjardin et al. | 74—5 |
| 3,453,894 | 7/1969 | Stiles et al. | 74—5 |

MANUEL A. ANTONAKAS, Primary Examiner

U.S. Cl. X.R.

74—5

UNITED STATES PATENT OFFICE
CERTIFICATE OF CORRECTION

Patent No. 3,540,294        Dated November 17, 1970

Inventor(s) George S. Macor

It is certified that error appears in the above-identified patent and that said Letters Patent are hereby corrected as shown below:

Column 1, line 4, change "Macon" to --Macor--.

Drawing Title, change "Macon" to --Macor--.

Signed and sealed this 29th day of June 1971.

(SEAL)
Attest:

EDWARD M. FLETCHER, JR.
Attesting Officer

WILLIAM E. SCHUYLER, J
Commissioner of Patent